United States Patent
Sistla

(10) Patent No.: US 7,502,889 B2
(45) Date of Patent: Mar. 10, 2009

(54) HOME NODE AWARE REPLACEMENT POLICY FOR CACHES IN A MULTIPROCESSOR SYSTEM

(75) Inventor: Krishnakanth V. Sistla, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 11/320,627

(22) Filed: Dec. 30, 2005

(65) Prior Publication Data

US 2007/0156964 A1    Jul. 5, 2007

(51) Int. Cl.
*G06F 12/12* (2006.01)

(52) U.S. Cl. .................. 711/133; 711/134; 711/136; 711/128

(58) Field of Classification Search .......... None
See application file for complete search history.

(56) References Cited

U.S. PATENT DOCUMENTS 7,284,095 B2 * 10/2007 Hu et al. .................. 711/133

2001/0051977 A1 * 12/2001 Hagersten .................. 709/203

OTHER PUBLICATIONS

Binstock, "Multiprocessors, Clusters, Grid and Parallel Computing: What's the Difference=," *Intel Corporation*, May 4, 2004, pp. 1-6.
"MultiProcessor Specification," *Intel Corporation*, May 1997, Version 1.4.

* cited by examiner

*Primary Examiner*—Reginald G Bragdon
*Assistant Examiner*—Thanh D Vo
(74) *Attorney, Agent, or Firm*—Kenyon & Kenyon LLP

(57) ABSTRACT

A home node aware replacement policy for a cache chooses to evict lines which belong to local memory over lines which belong to remote memory, reducing the average transaction cost of incorrect cache line replacements. With each entry, the cache stores a t-bit cost metric ($t \geq 1$) representing a relative distance between said cache and an originating memory for the respective cache entry. Responsive to determining that no cache entry corresponds to an access request, the replacement policy selects a cache entry for eviction from the cache based at least in part on the t-bit cost metric. The selected cache entry is then evicted from the cache.

24 Claims, 13 Drawing Sheets

---

502
Store, with each entry in a cache, a t-bit cost metric representing a relative distance between the cache and an originating memory 504
Responsive to determining that no cache entry corresponds to an access request, select a cache entry for eviction based at least in part on the t-bit cost metric 506
Evict the selected cache entry from the cache

502

Store, with each entry in a cache, a t-bit cost metric representing a relative distance between the cache and an originating memory

504

Responsive to determining that no cache entry corresponds to an access request, select a cache entry for eviction based at least in part on the t-bit cost metric

506

Evict the selected cache entry from the cache

FIG. 5

HOME NODE AWARE REPLACEMENT POLICY FOR CACHES IN A MULTIPROCESSOR SYSTEM

TECHNICAL FIELD

Embodiments of the present invention relates to a set-associative cache in a processor node of a multiprocessor system having distributed shared memory.

BACKGROUND

Business applications like transaction processing require multiprocessor systems which can execute a large number of relatively independent threads. Computer systems using multiple processors have existed for decades in various forms, the most common of which have been multiprocessing servers and mainframes. The advent of inexpensive, high-performance processors has provided impetus to the development of multiprocessor designs.

A common architecture in the art has been referred to as Symmetrical Multiprocessing (SMP). Multiple processors are, by definition, "symmetrical" if any of them can execute any given function. On simple SMP systems, each processor has equal access to all of the system memory via a centralized, shared memory controller. The "cost" of a memory access is statistically uniform across the SMP address space, since the memory-access average latency for each processor is substantially the same.

Because each processor also maintains its own on-board data cache, frequent data exchanges between processors are required to make sure the caches and memory are kept synchronized. These housekeeping transactions consume processor cycles, which is one reason that SMP performance does not scale linearly with the number of processors. Another reason is that all data fetched from memory must travel to the processors via a single memory bus. With only one bus to handle the data needs of multiple processors, the memory bus can become a serious bottleneck as the number of processors increases.

Designers in the mid-1990s developed a Non-Uniform Memory Access (NUMA) scheme. In this model, the processors are provided direct access to a private area of main memory. These processors can access the private "local" memory via a dedicated memory controller without using the system bus, whereas other processors must use the bus to access the private memory of another processor. The global memory space is divided into constituent memory domains and the latency to local memory is much lower than the latency to the memory on another processor. This scheme is "non-uniform" because memory is accessed differently depending on its location.

Since NUMA processors can access their local data directly, the number of processors a system can support without a significant memory bottleneck is significantly greater. In addition, because these processors still share a single globally shared memory space, the system appears to user applications as one homogeneous memory area.

While the "cost" of a memory access with respect to the execution pipeline in a NUMA system is non-uniform, conventional replacement policies continue to be employed in the caches of the individual processors.

BRIEF DESCRIPTION OF THE DRAWINGS

FIG. 5 is an overview of a cache replacement policy in accordance with embodiments of the present invention.

Figure 1:
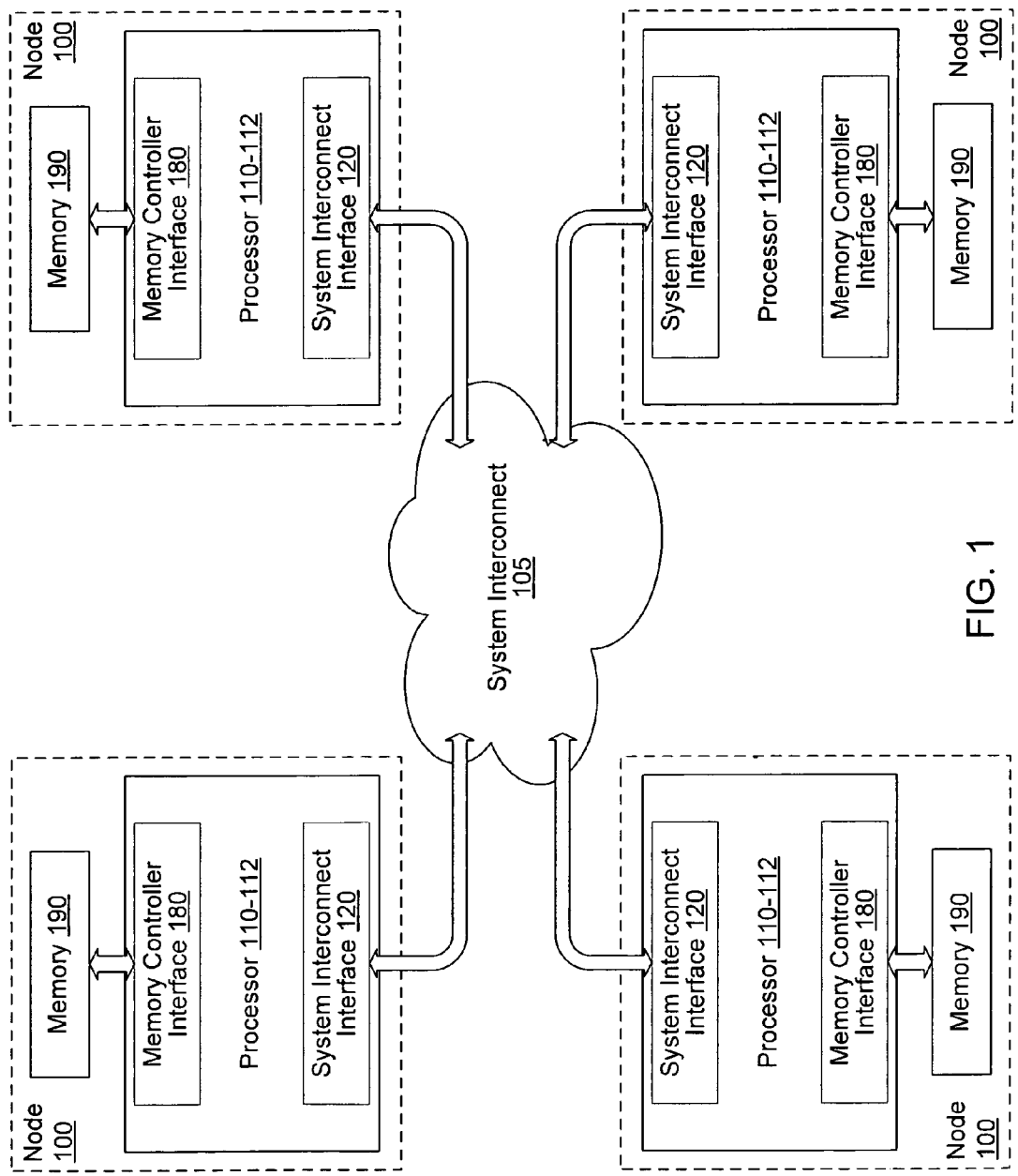
FIG. 1 illustrates a high level architecture of a NUMA system with distributed shared memory and includes nodes utilizing an improved cache replacement policy.

The figures are not drawn to scale.

DETAILED DESCRIPTION

In NUMA systems, there is a significant time-cost difference between access to local memory and access to memory on a different processor (as much as 50% lower). On-die latencies can be continuously improved with process improvements. However, system interconnect latencies improve at a much slower rate. This contributes to a widening gap between local memory latencies and remote memory latencies.

Current processor cache replacement policies do not take the cost of an incorrect replacement into account, since the cost is treated as uniform across all address space. An "incorrect" replacement is a replacement that causes a miss almost instantaneously. To improve overall performance in an asymmetric-cost environment, embodiments of the present invention account for this non-uniform cache-entry replacement cost and are implemented with little overhead over conventional cache replacement policies. Processor caches are biased to favor replacement of entries that belong to the local memory space over entries that belong to another processor's memory space.

In general, processors utilize two types of cache: write-through and write-back. In a write-through cache, every write to the cache causes a write to the originating memory (i.e., the physical memory from which the cache entry originated). In a write-back cache, writes are not immediately mirrored to originating memory. Instead, the cache tracks which of its locations have been written over, marking these locations as "dirty." The data in these locations is written back to the originating memory if the data is evicted from the cache. The dirty data can be written back to memory and then evicted from the cache, or can be evicted from the cache into a buffer, to be written-back from the buffer.

Processor nodes in a multiprocessor system may contain one-or-more cores which may or may not share a last-level cache (LLC). For the purpose of the architectures used as examples herein, the LLC in a processor refers to any cache in the processor whose dirty evictions are written back to the originating memory, whether local or remote. The LLC is at a bottom tier in a memory hierarchy of a processor above the distributed shared memory of the multiprocessor system. Stated differently, LLC is the last cache in the memory hierarchy before global memory is reached.

Depending on its internal architecture, there may be more than one LLC in a processor. In addition each processor may contain (or be attached to) a memory controller. The memory space connected to the memory controller is known as "local" memory. The memory space connected to the memory controller of a different processor is known as "remote" memory. It is possible that memory controllers may exist as independent entities within the global memory space, serving as nodes in the global memory space without being affiliated with a processor (i.e., nodes that exist only to provide remote memory). Likewise, it is also possible to have processor nodes within the architecture that have one or more LLC, but no local memory.

The processors and interconnect(s) support mechanisms which allow for the mapping of the local memory spaces on each processors into a globally shared memory space. An example of such an architecture can be found in the Common System Interconnect (CSI). CSI provides a distributed interconnect between the processors. The system address decoder (SAD) functionality in CSI allows the local memory on each processor to be mapped into a global memory space.

FIG. 1 illustrates the high level architecture of a NUMA system with distributed shared memory, including processors 110, 111, and/or 112 (described further below) utilizing the improved cache replacement policies. Since global memory is distributed among processor nodes 100, for any given address there exists a unique processor memory to which that address belongs. This processor is referred to as the "Home processor" or the "Home node" to a memory address.

Each processor node 100 includes a processor 110-112 comprising a system interconnect interface 120 to connect the processor to the system interconnect 105. The system interconnect 105 may comprise one or more interconnects of any topology and protocol. For example, the system interconnects may be via a Front Side Bus (FSB) or may be via a links-based interconnect which supports point-to-point connections between the processor nodes.

Each processor 110-112 also includes an integrated memory controller interface 180 tied to a local memory 190 (e.g., random access memory, holding program code and data during execution). As noted above, it is also possible to have nodes comprising a memory controller interface 180, memory 190, and system interconnect interface 120, without including an actual processor (i.e., a dedicated remote memory node), and nodes that include a processor 110-112, but include no local memory 190 (and may or may not have the memory controller interface 180).

Any of several internal architectures can be used within processors of the multiprocessor architecture. The processors in FIGS. 2-4 demonstrate three interchangeable examples. There are certain common features among these processor architectures: each processor 110-112 includes a System Address Decoder (SAD) 130 to translate global memory addresses into a home node address; and each processor 110-112 contains at least one LLC cache 140 whose dirty evictions are written back to the originating memory.

In each of FIGS. 2-4, a dotted line 134 illustrates the divide between global address space and actual address space, with global addressing being used below the line and actual addressing being used above the line. The System Address Decoder 130 translates across this divide.

Figure 2:
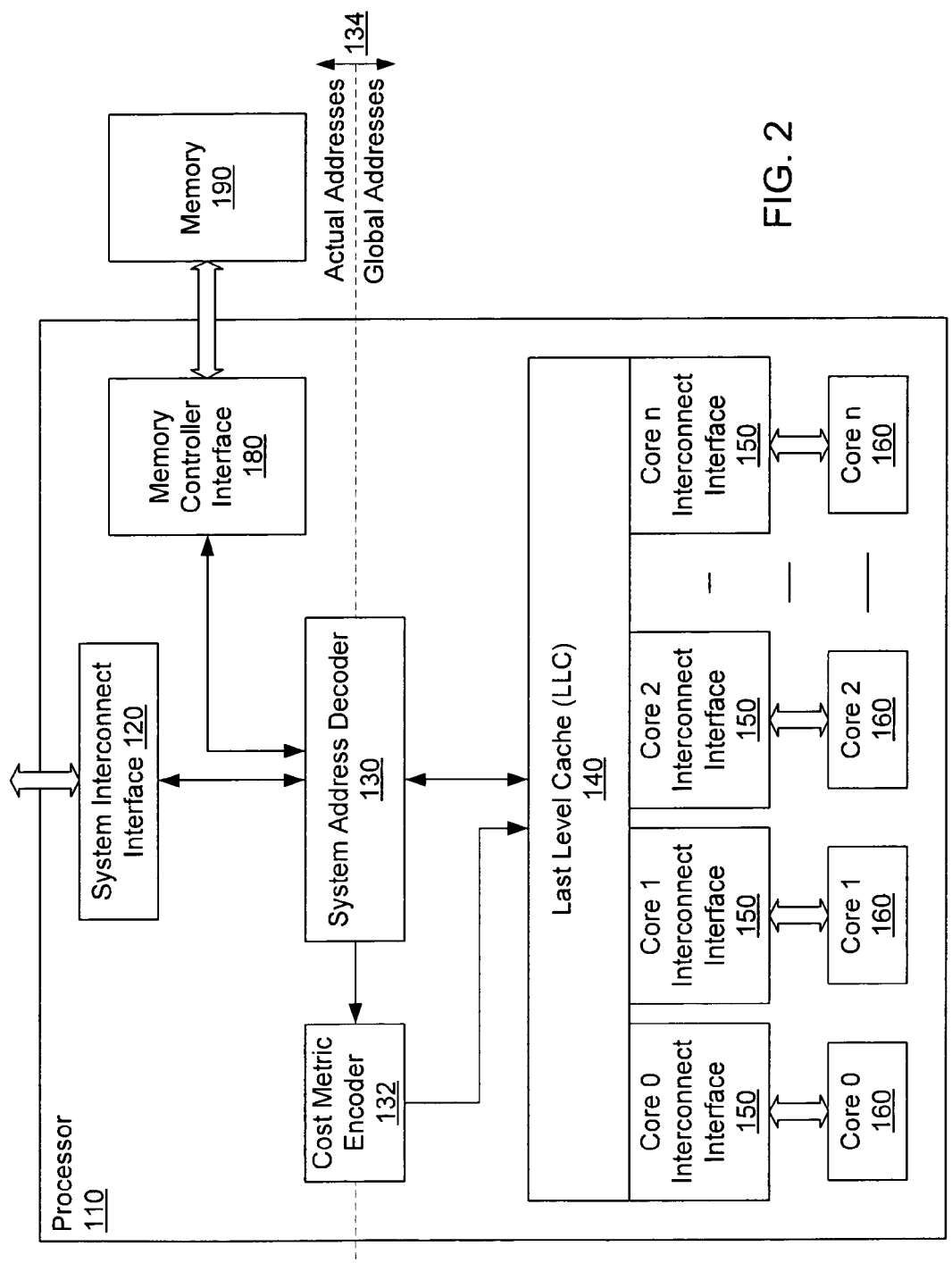
FIGS. 2-4 are examples of processors utilizing the improved cache replacement policy.

FIG. 2 is an example of a processor architecture in which a single LLC 140 is shared by all the processor cores 160 in the processor 110. Although "n" cores are illustrated, this architecture can also be used with a single core. Cores 160 in the processor 110 communicate with the LLC 140 using the on-die interfaces 150. On any access that requires memory (for example a cache miss or a dirty eviction), the system address decoder 130 is accessed to determine whether the access belongs to local memory or remote memory. If the address belongs to local memory 190, the local memory interface 180 is accessed; other wise the access issues to the system interconnect 120 with the appropriate destination processor identifier. In this example architecture, entries in the LLC 140 are tagged with their address in the globally shared address space, rather than with their actual address.

Figure 3:
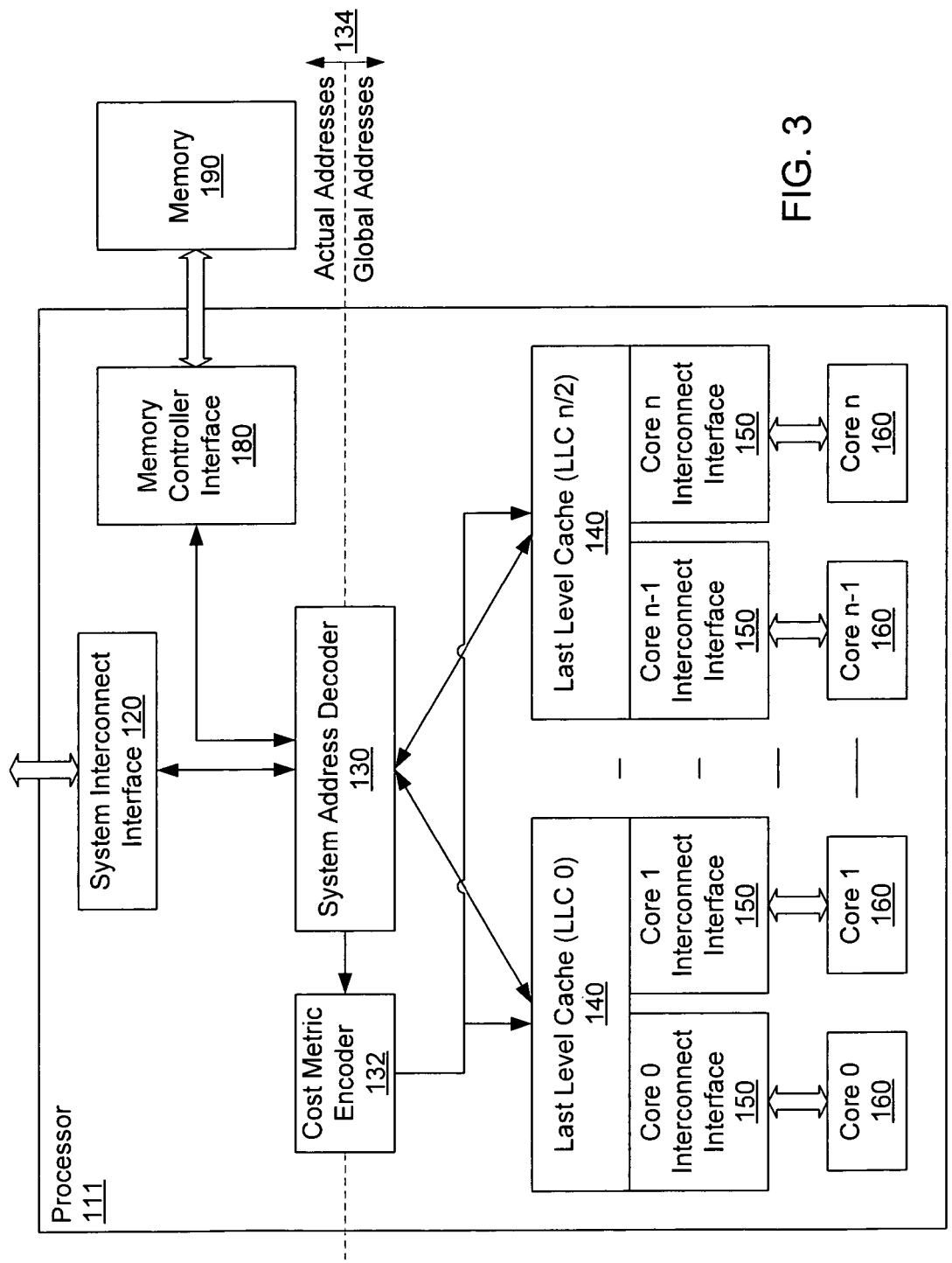

FIG. 3 is an example of a processor architecture where there are a plurality of LLCs 140, with one or more cores 160 communicating through each LLC 140 of the processor 111. Operation is otherwise the same as described with the example of FIG. 2. With operating systems increasingly being optimized for dual-core processing, this architecture facilitates two or more cores sharing a single cache, while enabling plural caches to share a same local memory. If there are m cores per cache and n cores per processor, this implies n/m LLCs. Whenever there is a miss or an eviction from any of the LLCs 140, the system address decoder 130 determines the appropriate destination memory controller.

Figure 4:
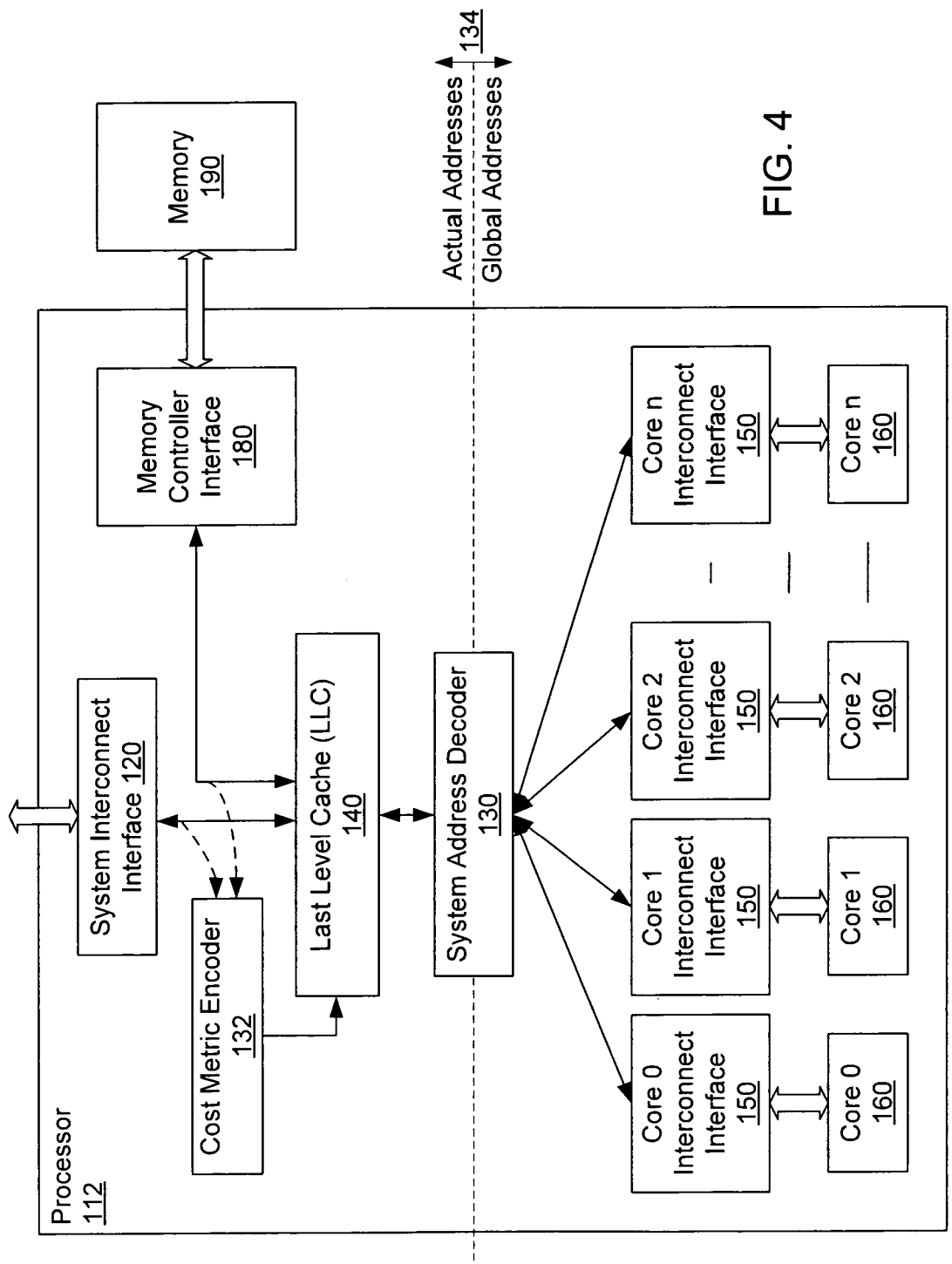

FIG. 4 is an example of a processor architecture where entries in the LLC 140 are tagged with their address in the originating memory. Although "n" cores are illustrated, this architecture can also be used with a single core. The cores 160 of processor 112 use addresses in the globally shared address space, with the system address decoder 130 translating the globally shared address into the actual address.

As is conventional in a cache, when one of the cores 160 issues a read or write request for a location in the globally shared address space, the cache 140 checks whether data from that memory location is already in the cache. This is accomplished by comparing the address of the memory location with the "tags" in the cache that might contain the address. In a conventional set-associative cache having R "ways," any particular location in memory can be cached in R locations within the cache. For example, in response to a read request from a core 160, if the data associated with a requested address is in the cache 140 (a "hit"), the data can be read from a way in the cache instead of memory (saving time); if the data is not in the cache 140 (a "miss"), the data is fetched from memory and stored in the cache 140. Similarly, in response to a write request from a core 160, if data associated with an address in the request already exists in the cache (a "hit"), data in the write request can replace the data in the cache; if no data associated with the address exists in the cache (a "miss"), the data is stored in the cache 140.

On a cache miss, both a read request and a write request will lead to a "fill." If the cache is already full, the cache must "evict" one of the existing entries to accommodate the new "fill" caused by the miss. The heuristic used to choose which entry to evict is called the "replacement policy." The cache replacement policy used for choosing the "victim" line (the evicted line) plays a crucial role in the performance of the system. Since the replacement algorithm is conventionally implemented in the tag logic of the cache, the complexity of the replacement algorithm has a direct impact on the speed of the cache.

If lines that have been modified by a core 160 are replaced, such lines are referred to as dirty evictions. Non-dirty evictions are simply dropped in the cache. Dirty evictions are written back to the originating memory and hence must be written back to the Home node for the replaced address.

If a replacement policy chooses to evict lines which belong to local memory over the lines which belong to remote memory, then the average cost of an incorrect replacement can be reduced. Existing replacement algorithms can be extended to take the non-uniform miss penalty in to account.

FIG. 5 is an overview of a cache replacement policy in accordance with embodiments of the present invention. With each entry, a cache stores (502) a t-bit ($t \geq 1$) cost metric representing a relative distance between the cache and an originating memory corresponding to the cache entry. Responsive to determining that no cache entry corresponds to an access request, the replacement policy selects (504) a cache entry for eviction based at least in part on the t-bit cost metric. The selected cache entry is then evicted (506) from the cache.

The cost of an incorrect replacement can be measured by a relative "distance" of the home node to the cache which is replacing the line. Given a system topology, the distances to all the home nodes in the system can be arranged in an increasing order and assigned a t-bit ($t \geq 1$) cost metric. Let us assume that the set of distances D is ($d_0$, $d_1$, $d_2$, . . . $d_x$). Distance $d_0$ always denotes the distance to the local memory. Let $s_i$ denote a set of all nodes which are at a distance $d_i$ from the replacing cache. Then the set of all nodes in the system S can be partitioned into ($s_0$, $s_1$, $s_2$, . . . $s_x$). The mapping from S to D is one-to-one; put differently, for any given node in the system, its distance to the replacing cache is unique and belongs to the set D.

Figure 6:
FIGS. 6 and 7 illustrate example system configurations.
Figure 7:
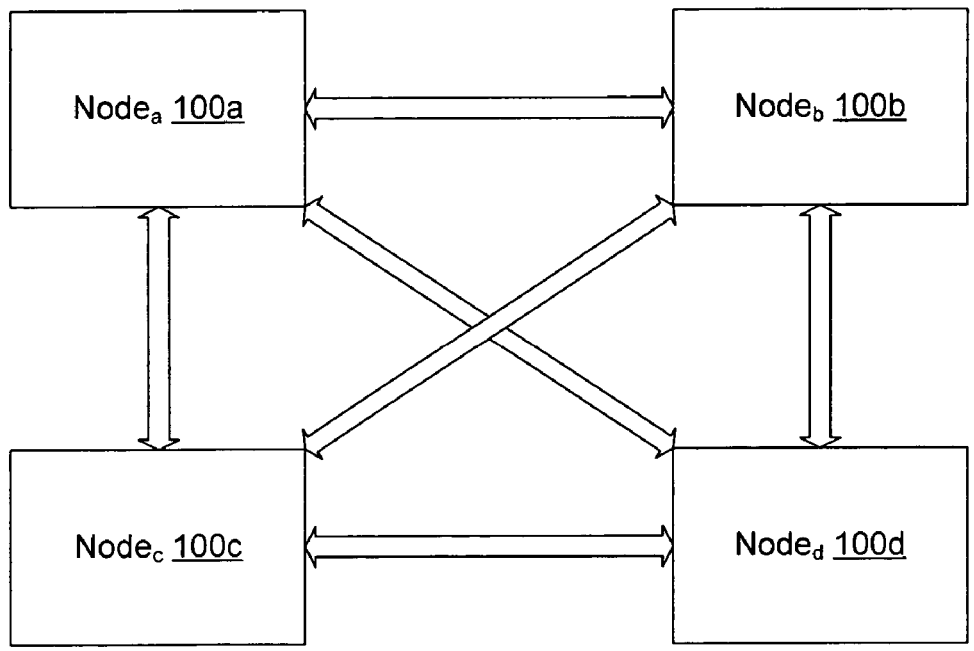

FIG. 6 and FIG. 7 show two configurations where t is set to 1. Note that these configurations are symmetric and fully connected; that is, the distance set (D) is the same for all processors caches in the system.

For the configuration shown in FIG. 6, D is (0, 1) and S with respect to $node_a$ 100a is ($node_a$, $node_b$). For the configuration shown in FIG. 7, D is (0, 1), assuming the cost-metric between every node to be the same, S with respect to $node_a$ is ($node_a$, {$node_b$, $node_c$, $node_d$}), S with respect to $node_b$ is ($node_b$, {$node_a$, $node_c$, $node_d$}) and so on. In general for a fully connected symmetric system, there are only two distances: local and remote. These distances are encoded as binary '0' and '1' respectively in the replacement algorithm.

The general principles of the home-node aware replacement policies disclosed herein can be applied to any cache replacement policy.

An example of a well-known replacement policy is "Least Recently Used" (LRU), which as the name suggests, evicts the least recently used cache entry. With continuous improvement in the cache speeds, there has been a push towards simpler cache replacement algorithms. Simpler cache replacements algorithm sacrifice some locality information when compared to a "perfect" algorithm. Some examples of simpler LRU replacement algorithms implemented in recent designs are the pseudo-LRU algorithm and the Age-based LRU algorithms. Simpler replacement algorithms increase the probability of incorrect replacement. A replacement is considered an "incorrect" replacement if immediately following the replacement (i.e. within the next few accesses), a request occurs to the same address as the data that was evicted.

Figure 8:
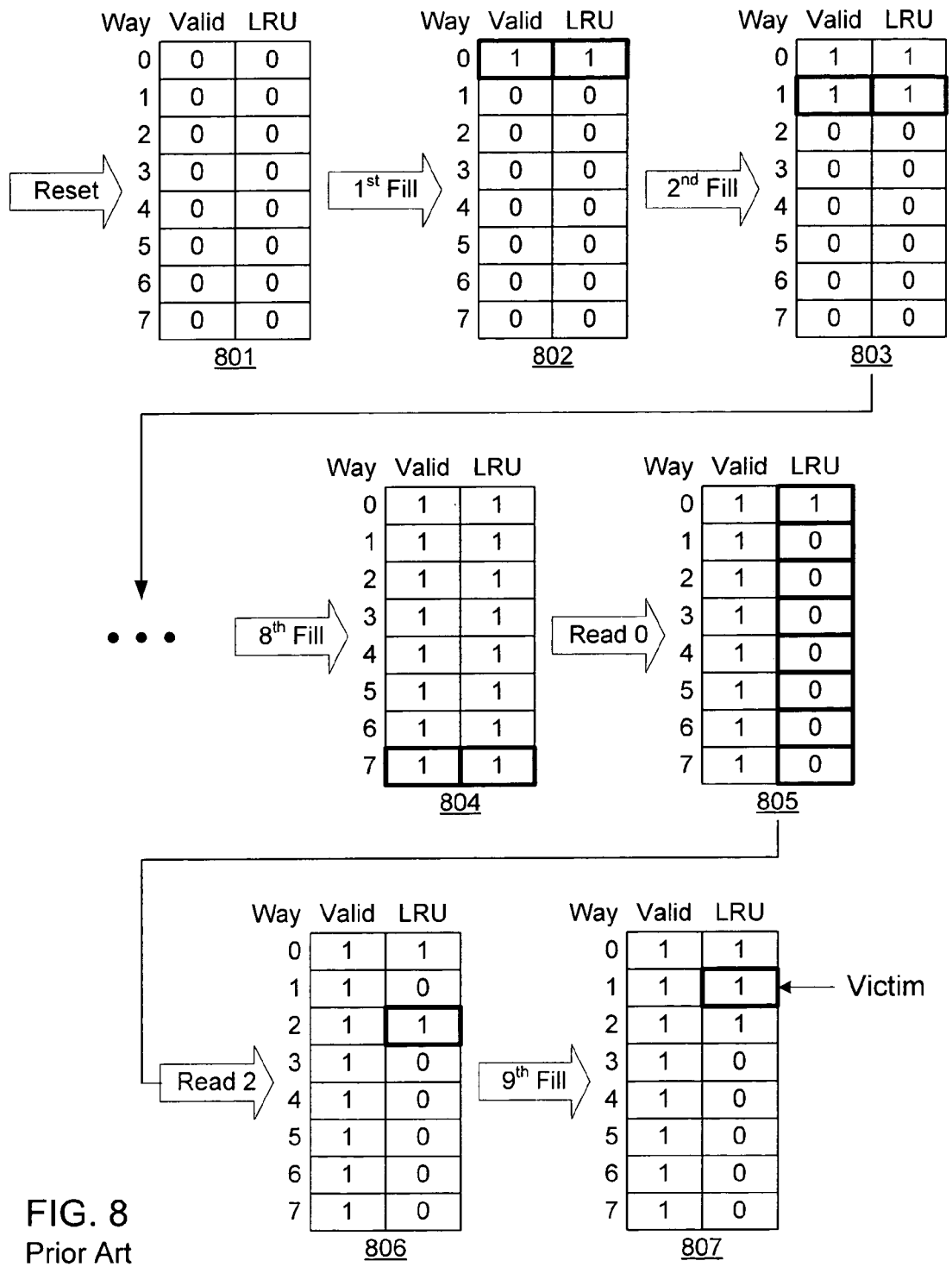
FIGS. 8 and 9 demonstrate a conventional age-based Least Recently Used (LRU) algorithm.
Figure 9:
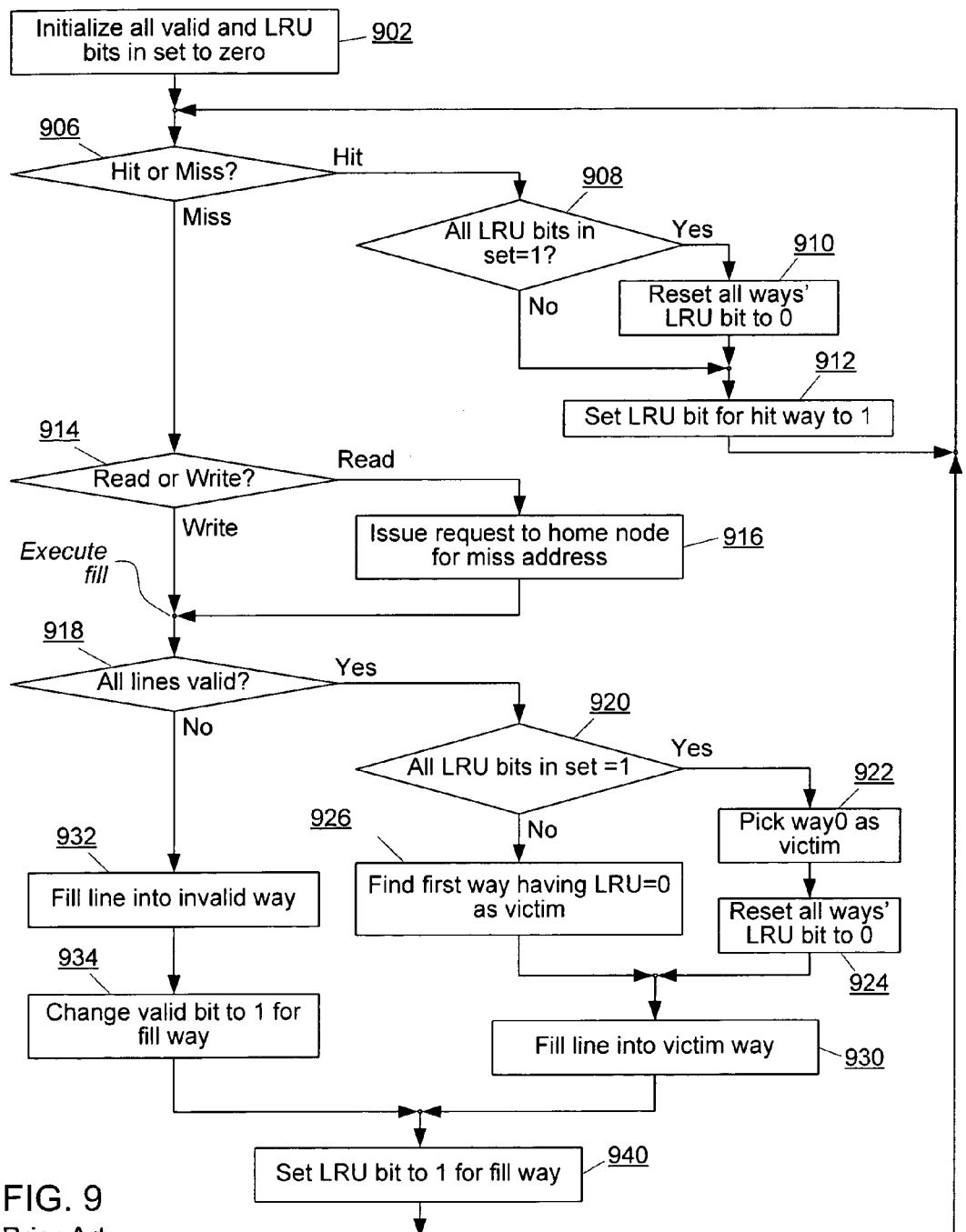
Figure 10:
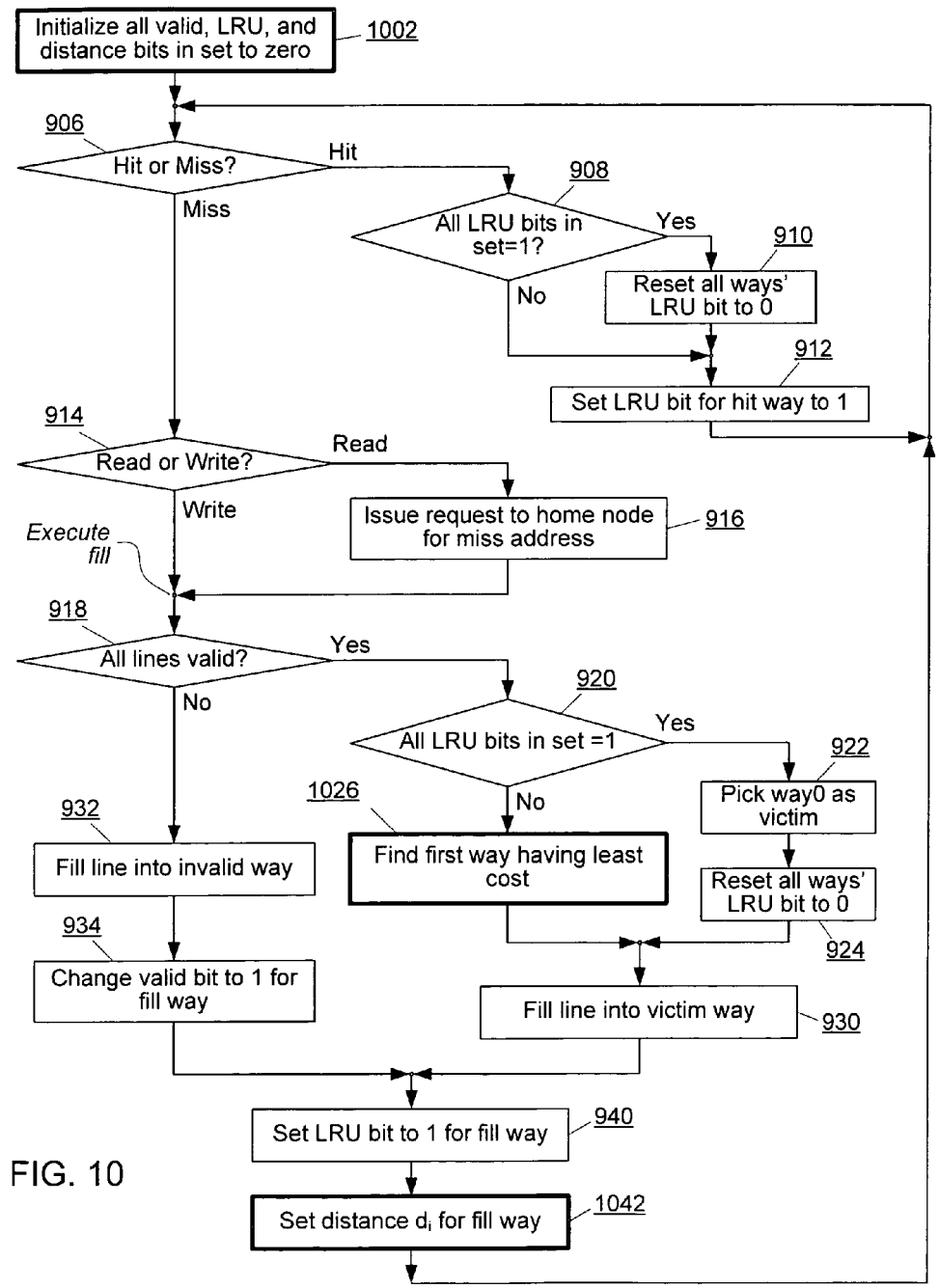
FIGS. 10-12 illustrate an age-based LRU algorithm modified to be home-node aware.
Figure 11:
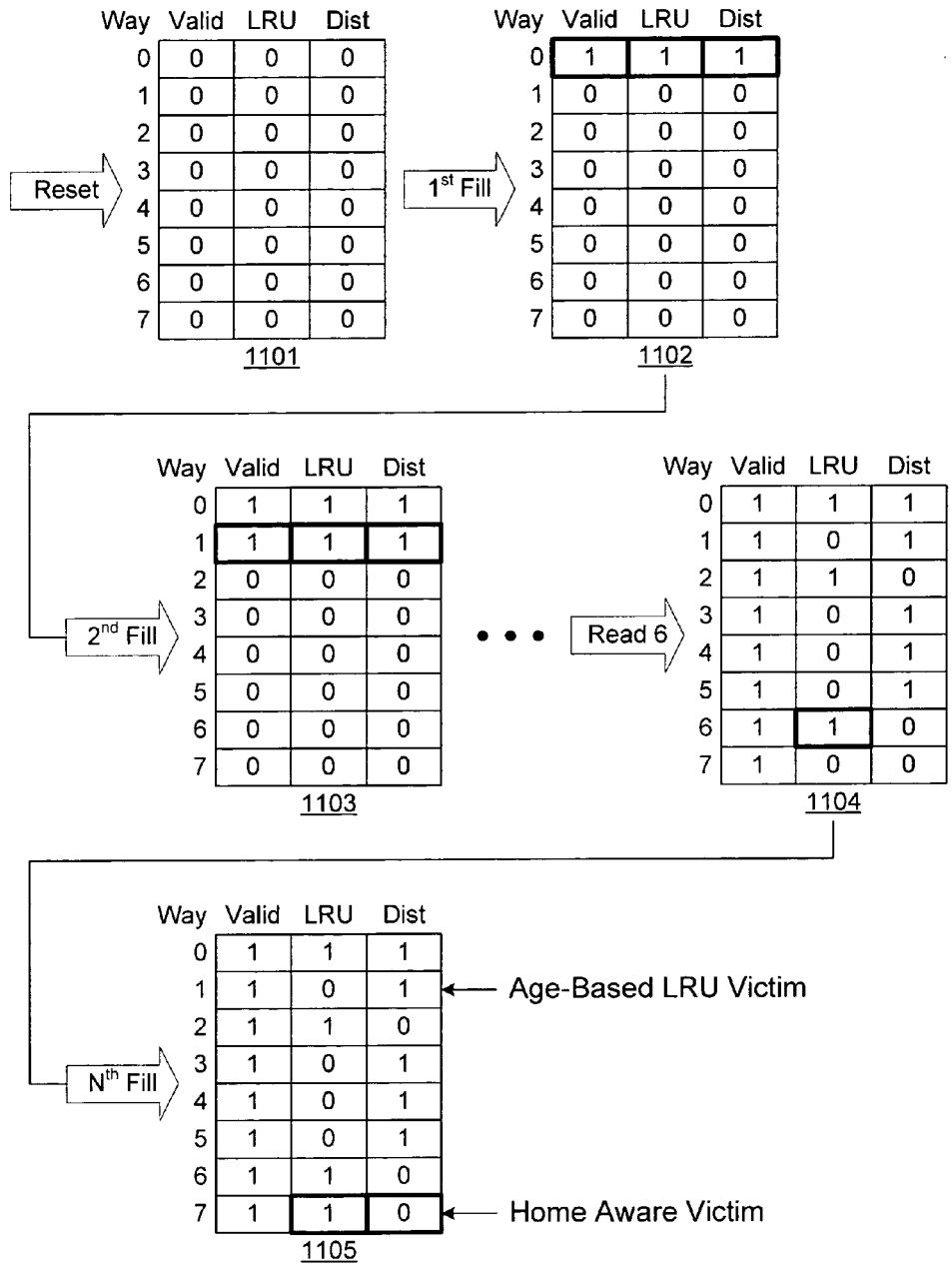
Figure 12:
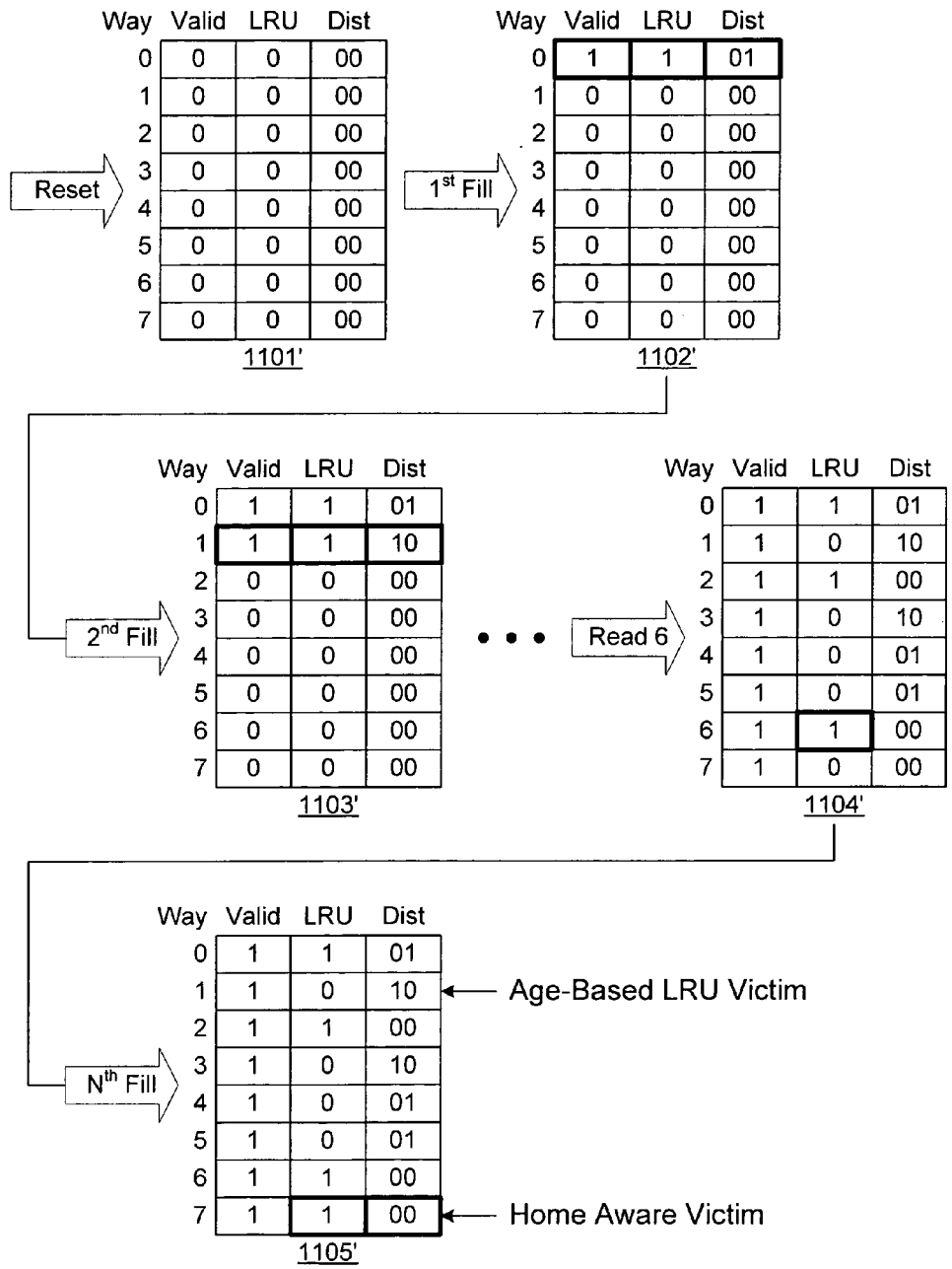

As a baseline, FIGS. 8 and 9 demonstrate the operation of a conventional age-based LRU algorithm. FIGS. 10, 11, and 12 demonstrate the same age-based LRU algorithm, modified to take the non-uniform miss penalty in to account as described in FIG. 5.

Referring to FIG. 8, a bit vector is shown for a set with eight ways. The "Valid" bit indicates that a "way" contains data, and the "LRU" bit is used to indicate age. Once data has been stored in a way, the "Valid" bit is set to '1', without regard to age.

At the beginning (801), all the Valid and LRU bits are initialized to zero. With the first access that is a fill (802), the LRU bit with way0 is set to 1. For the second fill (803), the first invalid way (i.e., Valid bit equals zero) in the vector is used to choose the fill way (this turns out to be way1 in this case), and the LRU bit of the fill way is set to 1. Eventually after eight such fills (804), all the LRU bits in the vector are 1. If the 9 th access is a read to the line in way0, then the corresponding LRU bit is set to 1 and all other LRU bits are reset to zero (805). A subsequent read access which hits in the cache will set the LRU bit for the corresponding way. For example, a read to way2 (806) sets the LRU bit for way2 to 1. Assume now that a fill access occurs to this set. The first way which has an LRU bit that is zero is chosen as the victim way and the cache line in the corresponding way is evicted; the new line is filled into this way. In the example shown in FIG. 8, way1 is the victim way and the new line is filled into way1 (807). In the event of not finding any LRU bits in the vector containing a zero, the way0 is victimized.

Whenever all the LRU bits are set to 1 and a new read hit occurs, all LRU bits except the hit way are set to zero. This ensures that the most recent access is remembered but relative age information between all other ways is lost. This tradeoff is made in an age-based LRU algorithm to reduce the implementation complexity and storage space requirements.

FIG. 9 is a flow chart illustrating the age-based LRU algorithm with the bit vector in FIG. 8. The bit vector is initialized (902) by setting all Valid and LRU bits to zero. A cache access produces a hit or miss (906). A cache hit may be a read or a non-fill write. A non-fill write occurs when a tag match occurs and data is written over within the cache; the way written over is marked dirty (not shown). Ordinarily, dirty evictions are written back to the originating memory when the dirty way is evicted, although depending upon coherency policies, a dirty eviction may be written back earlier.

If the cache hits and all LRU bits in the bit vector are set to 1 (908), then all ways' LRU bits are set to zero (910), except the way having the hit, which is set to 1 (912). If the cache hits and at least one LRU bit is zero, then the LRU bit for the hit way is set to 1 (912).

If the cache access is a miss, and the access is a read (914), then a request is issued to the home node for the data from the missed address (916). On a miss, either a read or a write cause a fill to be executed.

If all lines of the bit vector are valid (918) (i.e., the Valid bits of all ways are one) and if all of the LRU bits of the bit vector are 1 (920), then way0 is selected as victim (922) and all other ways' LRU bits are set to zero (924). The fill data is stored in the victim way (930), and the LRU bit of the fill way is set to 1 (940).

If all lines of the bit vector are valid (918) and if at least one LRU bit is not one (920), then the first way having an LRU bit that is zero is selected as victim (926). The fill data is stored in the victim way (930), and the LRU bit of the fill way is set to 1 (940).

If at least one line of the bit vector is invalid (918) (i.e., at least one Valid bit is zero), then the new line is filled into the first invalid way (932), the valid bit of the fill way is changed to 1 (934), and the LRU bit of the fill way is set to 1 (940).

For each of these fills (930, 932), the data stored in the way comprises either the write data that missed in the cache, or the data received in response to the request (916).

This process repeats for each cache access request.

FIG. 10 illustrates the age-based LRU algorithm of FIG. 9, modified to take the non-uniform miss penalty in to account. A Distance $d_i$ is stored as a t-bit cost metric with each cache line. The changes to the algorithm include initializing all of these Distance bits to zero, along with the Valid and LRU bits (1002); finding a first way having a least "cost" (1026) if all lines of the bit vector are valid (918) and if at least one LRU bit is not one (920); and setting a distance $d_i$ for the fill way (1042). Finding the first way having the least "cost" (1026) will be explained by demonstration in FIGS. 11-13.

FIG. 11 illustrates a cache bit vector where D is (0, 1). D is a t-bit cost metric (in this case, one bit) that is used, at least in part, in determining the least cost (1026). Valid data in each cache line is designated as either originating with the local memory ("0") or with a remote memory ("1"). At the beginning (1101), all of the Valid, LRU and Distance bits are set to zero. With the first access which is a fill (1102), the LRU bit with way0 is set to 1, and the Distance bit is set in accordance with the distance assigned to the originating node (in this case, to "1"indicating that the originating memory is remote). For the second fill (1103), the first invalid way is used to choose the fill way, with the LRU bit being set to 1 and the Distance bit being set in accordance with the distance to the originating node. Jumping forward in time to a later access in which there is a read-hit from way6 (1104), the LRU bit of way6 is set to 1, but the Distance bit remains unchanged.

If a miss occurs after the read-hit, the way selected as the victim differs between the process in FIG. 9 and the process in FIG. 10. With the fill after 1104, the way selected by the classic age-based LRU algorithm would be way1, which is the first way in which the LRU bit is zero. However, with this example of a home-node aware algorithm, the cost used to select the victim is based upon both the LRU bit (most significant cost bit) and the Distance bit (least significant cost bit): the first way have a cost of "00" is selected as victim, which happens to be way7. Accordingly, the new line is filled into way7 (1105).

If there had been no way with a cost of "00", then the first way having the next highest cost ("01") would be selected as the victim.

FIG. 12 illustrates the same operations as in FIG. 10, but in this example, t is 2-bits and D is (00, 01, 10, 11). In this example, the LRU bit is the most significant cost bit, and the Distance bits are the two least significant cost bits. Accordingly, the least cost is "000", then "001," then "010," then "011," etc.

Figure 13:
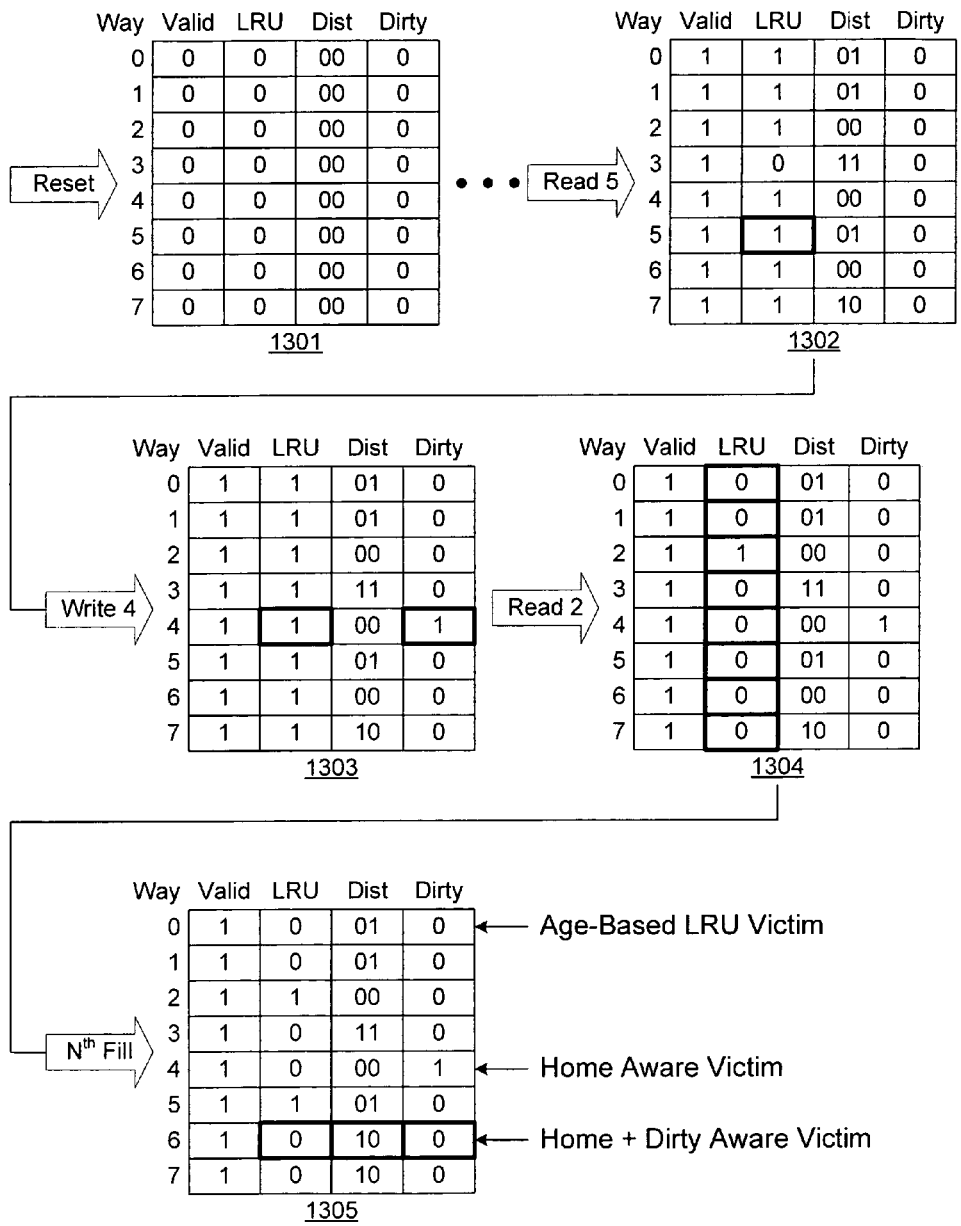
FIG. 13 illustrates a further extension of the modified LRU algorithm of FIG. 10.

The least cost (1026) can be weighted differently and/or expanded to include other bits in the bit vector. For example, FIG. 13 illustrates the operations from FIG. 10 where the dirty bit (which is ordinarily part of the bit vector) is included as part of a 4-bit cost. In this example, the LRU bit is the most significant cost bit, the Distance bits are the middle cost two bits, and the Dirty bit is the least significant cost bit. In this example, the least cost is "0000", then "0001,"then "0010," then "0011," then "0100," etc.

At the beginning (1301), all of the Valid, LRU, Distance, and Dirty bits are set to zero. Skipping forward, after a read to way5, the LRU bit for way5 is set to 1 (1302). The next access is a write, which hits on way4. As shown in 1303, the new line is written to way4; the LRU bit is set to 1, and the way is marked "dirty" by setting the Dirty bit to 1. If the next access is a read hit to way2, since all the LRU bits are 1, the LRU bits are all reset to zero with the exception of way2 (1304). If the next access produces a miss and the Dirty bit is the least significant bit of the cost, way6 is selected (cost=0000) as the victim and filled (1305).

An advantage of including the Dirty bit in the cost is to minimize outbound transactions from the cache by favoring eviction of lines that do not require a write-back. Lines that are not dirty are simply discarded when they are evicted. However, since dirty lines that are evicted must be written back to their Home node, an entry that must be written back to a remote node will create additional traffic over system interconnect 105.

As an alternative of the cost biasing in FIG. 13, the cost could use the inverse of the Dirty bit as an aspect of a cache coherency scheme, favoring the eviction of dirty lines to increase the frequency with which modified data is synchronized with the originating memory.

As can be understood from the examples in FIGS. 11-13, biasing the cost used for eviction is as simple as determining the ordering/significance of the bits included in the cost. For example, referring to FIG. 13, the Distance bits could be the least significant bits, with the Dirty bit being given an increased significance for the selection of the evicted way.

Figure 14:
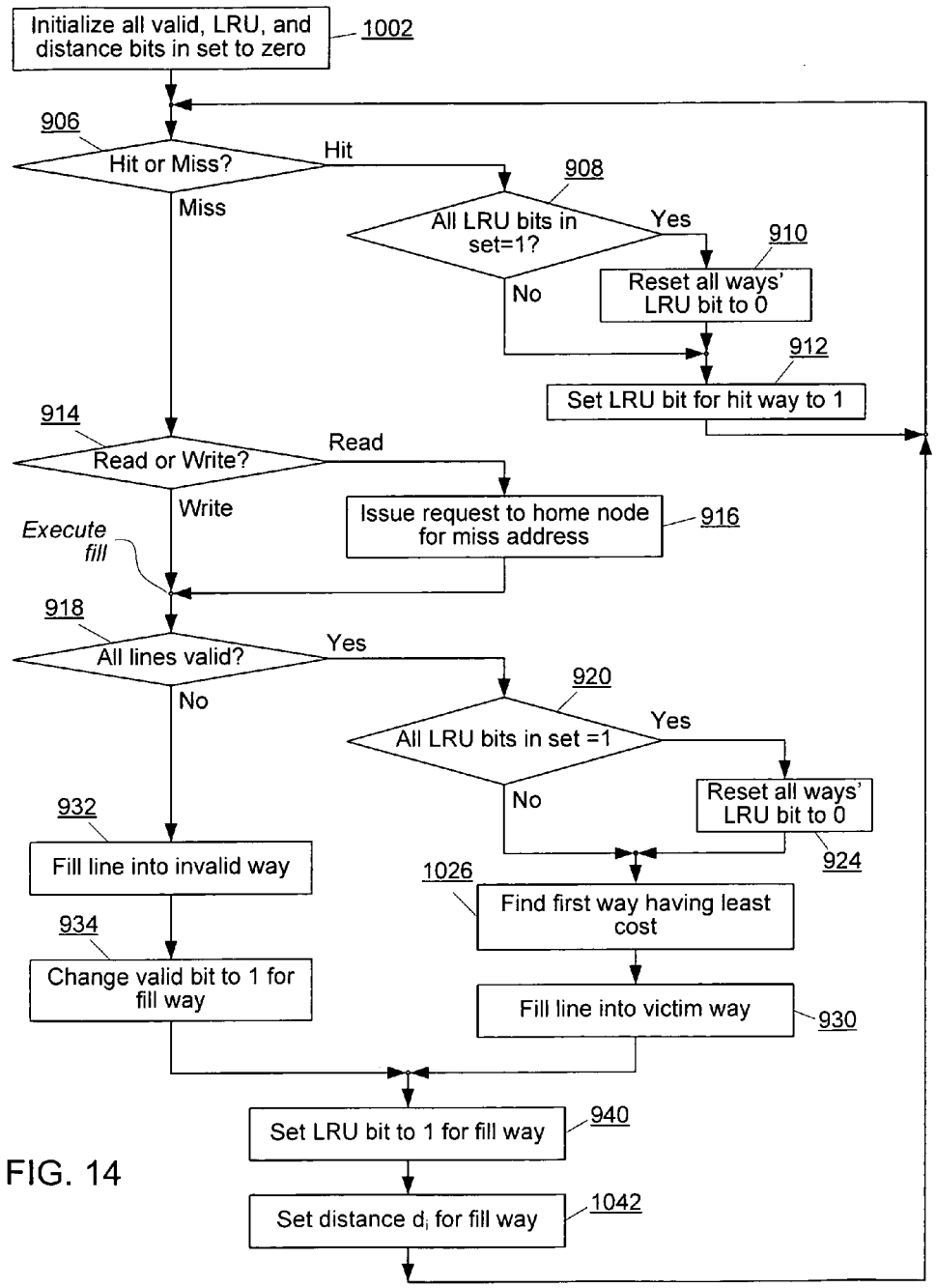
FIG. 14 illustrates a variation on an LRU algorithm.

Any number of variations are possible. For example, FIG. 14 illustrates a new age-based LRU algorithm that emphasizes the utility of the "cost" concept (1026) by using least cost to pick the victim way if all lines are valid and all LRU bits are 1, instead of arbitrarily picking way0 (922 in FIGS. 9 and 10), as is classically done.

In the various examples, the distance is provided by a cost metric encoder 132 which translates an identity of an originating memory into the t-bit cost metric D based on a source address of a line in the globally shared memory space.

The system address decoder 130 and the cost metric encoder 132 may be initialized by a basic input/output system (BIOS) of the system. Among other ways, the BIOS may distribute addresses in the global address space, partitioning physical memory by nodes and creating a map correlating global addresses to physical address; the map is then distributed to the various nodes 100.

The cost metric D for the system may be programmed or adaptive. An example of an adaptive method to create the cost metric D is to perform a stream test. A stream of reads is sent from a node 100 (e.g., node "a" in FIG. 7) to all of the other nodes, counting the clock cycles until a reply is received to determine an average latency. This latency is then used as an indicia of "distance."

If using a stream test, one node may act as a master for the entire system at initialization, creating a table of distances between all of the nodes, and then distributing the table to the cost metric encoders 132 of all of the other nodes. This method of initialization is particularly simple if costs in the network are the same in both directions (i.e., the latency from a to b is the same as the latency from b to a).

Another way of performing the stream test is to have each node 100 determine its own cost metric D. This can be done, among other ways, in a round-robin fashion (e.g., passing a token designating which node is the master until all nodes have performed a stream test). This method of initialization is better if the latencies vary by direction, or if different nodes use different processors (for example, if one node adaptively sets the number of t-bits used for the cost metric D, and another node fixedly uses one bit (t=1)).

If the system allows nodes to be hot-swapped (added and removed during operations), stream tests may also be performed for the new node when the node is added to the system and added into global memory space.

Some systems are more sensitive to distance than others. For complex networks in which distance costs may vary during operation, architectural studies may be warranted. In this regard, the numerous algorithms used with macro networks (e.g., wide-area data and voice networks) to allocate cost-weights between nodes may be applicable.

The initialization routines may be built into hardware, may be programmed into software or firmware, or handled by a specialized engine within the network (e.g., a processor with responsibility for managing the partitioning of the global address space).

Initialization may also include biasing the "cost" used to determine evictions. Automated optimization can be performed by the system simply by measuring performance statistics for a plurality of different biasing schemes (cost bit-orderings; e.g.; LRU-Distance-Dirty; Distance-LRU-Dirty; Distance-Dirty-LRU). Biasing may be changed after initialization, if warranted by performance statistics (e.g., percentage of incorrect evictions). For example, different nodes may be initialized to use different cost biasing schemes. At some point after operations have commenced, the nodes 100 share (e.g., by polling) their performance statistics. At that point the bias scheme utilized by a node having the highest performance statistics may be propagated and used by nodes 100 having inferior performance. Likewise, if a specialized engine handles generation of performance statistics (e.g., a processor with responsibility for calculating performance statistics), the engine may instruct one or more processors to change its cost bias based on performance.

The t-bit cost metric D may be encoded or raw. An encoded cost metric uses t bits for $2^t$ costs; e.g., four distances require two bits (00, 01, 10, 11). A raw cost metric uses t bits for t costs; e.g., four distances require four bits (0001, 0010, 0100, 1000). Considerations as to whether to implement an encoded or a raw cost metric D include the balance between the complexity of the compare logic and the memory space required in the cache 140 to store the cost metric D. For systems with relatively few nodes 100, a raw cost metric may have advantages, since the memory overhead is small. In comparison, for systems with many nodes 100, the memory saved by using an encoded value may outweigh the added logic complexity.

In accordance with embodiments of the present invention, which entry or entries are evicted is based in part upon the t-bit cost metric representing the relative distance between a cache 140 and the originating memory. While several of the examples herein include a least recently used (LRU) bit and are based on age-based LRU policies, any replacement policy may be biased with the cost metric D. The home-node aware replacement policy may be entirely modular; similar extensions may be applied to other replacement algorithms which are currently not home-node aware.

Evictions from a cache in the nodes 100 may be written directly back to the originating memory, or may be locally buffered and then written back. The write back may occur before a line is evicted, or after a line is evicted.

Although the examples illustrate that read requests are sent to the home node only if there is a cache miss (which is preferred to minimize system interconnect bottlenecks), configurations may also be utilized in which the read request is sent to the originating memory prior to the hit/miss determination (906), with the reply to the read request being ignored if there is a hit.

Any topology can be used to interconnect the nodes 100, including a shared bus and a plurality of dedicated busses between nodes.

While the home-node aware replacement policy for caches is described in the context of NUMA architectures, it is also applicable to any dual processor (DP) or multiprocessor (MP) system in which plural memories may be accessed by a cache. In volume DP and MP space, non-NUMA operating systems apply uniform interleaving of memory across local memory and remote memory. With uniform interleaving, the effectiveness of home aware replacement further increases. For DP systems there 50% chance that a line belongs to remote memory and with a MP system there is a greater than 75% change that a line belongs to remote memory. By favoring local memory replacements, there is significant potential for performance improvement.

Although the example nodes each include a System Address Decoder 130 to translate global memory addresses into a home node address, a home-node aware replacement policy may also be utilized in distributed memory systems omitting SAD 130 in which actual addresses and global addresses are the same. Even if the SAD 130 is omitted, the cost metric encoder 132 can be included to determine the appropriate t-bit cost metric D.

All or a portion of the cache replacement policies described herein may be realized in hardware or as software code. Execution of the software code can be implemented as hardware. Such software code can be stored as machine-readable instructions on a storage component. The storage component may be any type of machine readable medium (i.e., one capable of being read by a machine) such as a compact disk, hard drive memory, flash memory, floppy disk memory, DVD-ROM, CD-ROM or any type of machine readable (computer readable) storing medium.

Specific examples of the invention are illustrated and/or described herein. However, it will be appreciated that modifications and variations of the invention are covered by the above teachings and within the purview of the appended claims without departing from the spirit and scope of the invention.

What is claimed is:

1. A system comprising:
   a plurality of processor nodes that share distributed memory, each processor node including a processor core;
   at least one interconnect interface, each interconnect interface to provide a path from a respective processor node to at least one other processor node of said plurality of processor nodes; and
   a cache to store copies of data used by the processor core, the cache to write-back a cache entry selected for eviction from the cache to a memory of the distributed memory from which the cache entry originated,
   wherein the cache is to store with each cache entry a cache bit vector, wherein the cache bit vector comprises a t-bit cost metric and one Least Recent Used (LRU) bit, the t-bit cost metric represents a relative distance between said cache and the originating memory of a cache entry, where t>1, and the LRU bit is set if the cache entry is accessed and reset if all LRU bits are set and another cache entry is accessed, said cache to select which cache entry to evict based on the a cost value determined by the cache bit vector.

2. The system of claim 1, wherein a replacement policy of the cache is biased to evict a first cache entry having a t-bit cost metric representing a shorter relative distance before a second cache entry having a t-bit cost metric representing a longer relative distance.

3. The system of claim 1, at least one of the processor nodes of said plurality of processor nodes further comprising:
   a local memory;
   a memory controller connected to said local memory, said cache to access the local memory through the memory controller,
   wherein the local memory is assigned the t-bit cost metric representing a shortest distance to the cache.

4. The system of claim 3, wherein t=1 for at least one of the processor nodes having the local memory, the 1-bit cost metric having a first state representing the local memory within the respective processor node and having a second state representing remote memory accessible via said at least one interconnect interface.

5. The system of claim 3, wherein t>1 for at least one of the processor nodes having the local memory, the t-bit cost metric having a first state representing the local memory within the respective processor node, and having a plurality of other states representing relative distances to remote memory accessible via said at least one interconnect interface.

6. The system of claim 5, wherein the t-bit cost metric has $2^t$ states, encoded to represent up to $2^t$ relative distances.

7. The system of claim 5, wherein the t-bit cost metric has t states, to represent up to t relative distances.

8. The system of claim 1, each processor node further comprising:
a system address decoder to map memories of the distributed memory into a globally shared memory space, the processor core of the processor node to address the globally shared memory space.

9. The system of claim 8, wherein each cache entry is tagged based on a source address in the globally shared memory space.

10. The system of claim 9, each processor node further comprising:
a cost metric encoder to translate an identity of the originating memory into the t-bit cost metric.

11. The system of claim 8, wherein each cache entry is tagged based on a source address in the originating memory, the processor core to access the cache through the system address decoder.

12. The system of claim 1, wherein the relative distance between said cache and the originating memory corresponds to a relative latency time between said cache and the originating memory.

13. A device comprising:
a cost metric encoder, to translate addresses into t-bit cost metrics, where t>1 and each t-bit cost metric corresponds to a relative latency for completion of at least one data request to a respective address; and
a cache, wherein the cache includes a plurality of cache entries and the cache is to store with each cache entry a cache bit vector, each cache entry to store data associated with an address, wherein the cache bit vector comprises a t-bit cost metric and a Least Recently Used (LRU) bit, the t-bit cost metric corresponds to the address, and the LRU bit is set if the cache entry is accessed and reset if all LRU bits are set and another cache entry is accessed; and
an interface to receive access requests;
wherein data in a storage location of the plurality of storage locations is to be selected for eviction based on a cost value determined by the cache bit vector to be replaced by data associated with a requested address, if the cache receives an access request for the requested address and the requested address is not associated with data stored in the cache.

14. The device of claim 13, wherein a replacement policy of the cache is biased to evict data from a first cache entry storing a t-bit cost metric corresponding to a shorter relative latency before a second cache entry storing a t-bit cost metric corresponding to a longer relative latency.

15. A method comprising:
storing, with each entry in a cache, a cache bit vector comprising a t-bit cost metric (t≧1) and a Least Recently Used (LRU) bit, wherein the t-bit cost metric represents a relative distance between said cache and an originating memory for a respective cache entry, and the LRU bit is set if the cache entry is accessed and reset if all LRU bits are set and another cache entry is accessed;
responsive to determining that no cache entry corresponds to an access request, selecting a cache entry for eviction from the cache based on a cost value determined by the cache bit vector; and
evicting the selected cache entry from the cache.

16. The method of claim 15, wherein said selecting the cache entry for eviction is in accordance with a replacement policy biased to evict a first cache entry having a t-bit cost metric representing a shorter relative distance before a second cache entry having a t-bit cost metric representing a longer relative distance.

17. The method of claim 16, further comprising:
determining the relative distance between said cache and each originating memory based on a latency for completion of at least one data request from the cache to the respective memory.

18. A machine-readable medium storing instructions adapted to implement a cache replacement policy, the cache replacement policy comprising:
storing, with each entry in a cache, a cache bit vector comprising a t-bit cost metric (t≧1) and a Least Recently Used (LRU) bit, wherein the t-bit cost metric represents a relative distance between said cache and an originating memory for a respective cache entry, and the LRU bit is set if the cache entry is accessed and reset if all LRU bits are set and another cache entry is accessed;
responsive to determining that no cache entry corresponds to an access request, selecting a cache entry for eviction from the cache based on a cost value determined by the cache bit vector; and
evicting the selected cache entry from the cache.

19. The machine-readable medium of claim 18, wherein the cache replacement policy is biased to evict a first cache entry having a t-bit cost metric representing a shorter relative distance before a second cache entry having a t-bit cost metric representing a longer relative distance.

20. The machine-readable medium of claim 19, the cache replacement policy further comprising:
determining the relative distance between said cache and each originating memory based on a latency for completion of at least one data request from the cache to the respective memory.

21. The machine-readable medium of claim 18, wherein the cache bit vector further comprises a dirty bit.

22. The machine-readable medium of claim 18, wherein the LRU bit is the most significant cost bit of the cache bit vector.

23. The machine-readable medium of claim 18, wherein the t-bit cost metric occupies the least significant cost t bits of the cache bit vector.

24. The machine-readable medium of claim 18, wherein biasing the cost for eviction is determined by ordering of the bits included in the cache bit vector.

* * * * *